United States Patent [19]

Pretot

[11] 3,907,723

[45] Sept. 23, 1975

[54] PHENOLIC RESINS

[75] Inventor: Monique Pretot, Creil, France

[73] Assignee: Certain-teed Products Corporation, Valley Forge, Pa.

[22] Filed: May 7, 1969

[21] Appl. No.: 822,713

[30] Foreign Application Priority Data

May 9, 1968 France .......................... 68.151171

[52] U.S. Cl. ............ 260/2.5 F; 260/2.5 Si; 260/826; 260/840
[51] Int. Cl.² ............................................ C08J 9/00
[58] Field of Search ...................... 260/2.5 F, 2.5 Si

[56] References Cited
UNITED STATES PATENTS

| | | | |
|---|---|---|---|
| 3,271,331 | 9/1966 | Ender | 260/2.5 F |
| 3,298,973 | 1/1967 | Quarles | 260/45.75 |

*Primary Examiner*—Paul Lieberman
*Attorney, Agent, or Firm*—Synnestvedt & Lechner

[57] ABSTRACT

This invention pertains to the manufacture of foams from phenolic resins and to the foams so produced. Such foams are made by mixing a blowing agent with the resin in a soft or fluid state, adding a hardening catalyst which produces an exothermic reaction of sufficient intensity to vaporize the blowing agent and form the foam, and hardening the foam. In such processes a strong acid is usually employed to generate the exothermic reaction but its action is accompanied by undesirable side effects, e.g. during the use of the foams as insulators for a metal object the residual acid in the resin may produce corrosion. To reduce that objection the resin has been processed to remove or neutralize the acid, or both, the attempt being to eliminate the large part of the acid and neutralize the residue. Such processing is difficult and imperfect. According to the invention Resorcinol is included in the composition of the phenolic resin which is to be foamed by acid catalysts. The presence of the Resorcinol is productive of several advantages including improvement of electrical properties, color stability and reduction of corrosive tendencies.

2 Claims, No Drawings

PHENOLIC RESINS

This invention pertains to the manufacture of foams from phenolic resins and to the foams so produced. Such foams are made by mixing a blowing agent with the resin in a soft or fluid state, adding a hardening catalyst which produces an exothermic reaction of sufficient intensity to vaporize the blowing agent and form the foam, and hardening the foam. In such processes a strong acid is usually employed to generate the exothermic reaction but its action is accompanied by undesirable side effects, e.g. during the use of the foams as insulators for a metal object the residual acid in the resin may produce corrosion. To reduce that objection the resin has been processed to remove or neutralize the acid, or both, the attempt being to eliminate the large part of the acid and neutralize the residue. Such processing is difficult and imperfect.

It is an object of this invention to improve the process of making phenolic resin foams, especially to prevent after action by the acid catalyst, to reduce the quantity of acid catalyst needed for the foaming and hardening, and to reticulate the resin effectively with little acid present in it. Another object is to produce phenolic resin foams which are inert compared to those now known. Another object is to eliminate or minimize the steps of acid removal or neutralization which were previously a major step in the process of making phenolic foams with acid catalysts.

The objects of the invention are accomplished, generally speaking, by including resorcinol in the composition of the phenolic resin which is to be foamed by an acid catalyst. The presence of resorcinol permits a substantial reduction in the amount of acid catalyst which is included in the composition. Resorcinol is dihydroxy benzene and has the formula

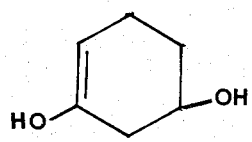

I have discovered that it reacts so strongly with the phenolic resin to initiate the reticulation that it is effective even in the presence of very small quantities of acid. I have also discovered that the foams which contain or are made by the use of resorcinol are less combustible than prior types, and that its presence reduces the quantity of blowing agent which is needed for foaming.

The novel process is applicable to the making of foams from all the acid catalyzed phenolic compositions which are ordinarily employed in the manufacture of such resins, but in addition it is useful in the manufacture of self-extinquishing foams such as those containing a dicyandiamide-formaldehyde resin, with which the addition of Resorcinol is particularly advantageous as the dicyandiamide-formaldehyde resin had a tendency to retard hardening and to compel the use of a larger quantity of acid catalyst with increasing disadvantage. The reduction of acid required is substantial and produces self-extinquishing foams of superior quality.

The invention is most effective with phenol formaldehyde resins of the Resol Type, and will be described in its application to water soluble phenol formaldehyde resins in which the ratio of formaldehyde to phenol (F/Ph) is 2 or more, as the best mode, but this particular description does not detract from the generality of its application to the preparation of acid-catalyzed phenol formaldehyde resin foams in general.

In usual practice it is efficient to mix the ingredients of the foamable commposition in the following order: Phenol formaldehyde resin, resorcinol, silicone oil, filler, blowing agent, catalyst. We will use hydrochloric acid as the catalyst in our disclosure, noting that other strong acids, especially mineral acids, are also useful. The catalyst should ordinarily be added last. The filler is not essential and can be omitted but it contributes its known functions, such as strengthening the foam, and is frequently included. The silicone oil is sometimes regarded as an internal lubricant, making for a freer operation and more uniform product; it can be omitted with some loss of process efficiency.

The Resorcinol may be added to the resin in any form but it is advantageous to use it in the form of an 80 percent aqueous solution. However, it may be added as a solid, preferably finely divided or as a more dilute solution in water. The proportion of Resorcinol to the weight of the resin is usually between about 5 and about 20 percent, and preferably between 5 and 8 percent for resins of the preferred mode. The quantity of acid catalyst can then be reduced by 60 to 70 weight percent of that customarily employed and the amount of blowing agent formerly employed can be reduced to 1-2 percent. Thus the product is purer and freer of prior additives.

The blowing agents are inert, gas forming compounds which vaporize at the temperatures attained during the reaction. Many thermally responsive, inert blowing agents have been described and all are useful in this process. Specifically, as the process is initiated at room temperature and exothermically generates a temperature from 80°–100°C., any organic product which is liquid at room temperature and boils between 22°and 80°C. can be usefully employed. In practice, we use hydrocarbons which are available on the market, for instance the halogen substituted hydrocarbons such as $CCl_3F$ and $C_2Cl_3F_3$. When using $CCl_3F$ one mixes below 25°C., the temperature may rise to 100°C. and the halogenated hydrocarbon vaporizes on the way up, forming the foam. Atmospheric pressure is satisfactory.

The reaction between the phenol formaldehyde resin, the Resorcinol, and the acid is complex and its internal nature is not well understood, but its effects are as stated. It appears to involve an exothermic condensation, but whatever the mechanism it reduces the quantity of acid catalyst needed and even reduces the amount of blowing agent required.

The foams may be made self-extinguishing by including a dicyandiamide-formaldehyde resin in the mixture before adding the acid catalyst. Such resins are made by condensing dicyandiamide in water solution with formaldehyde using a basic catalyst such as NaOH. Other anti-flaming agents can be incorporated as so much filler.

The following examples illustrate the invention without detracting from the generality elsewhere herein stated.

EXAMPLE 1

A mixture of 100 parts by weight of fluid phenol formaldehyde resin was mixed with 7.5 parts by weight of Resorcinol as a solution in water containing 80 percent Resorcinol, 1.5 parts of silicone oil, 5.5 parts of mineral filler, 4 parts of fluoro chloro hydrocarbon blowing agent, in this case freon 11, and 5.5 parts of HCl as a water solution of 35 percent strength.

The reaction began immediately, the temperature rose steadily, the freon was vaporized in tiny bubbles within the mass, and a foam formed and hardened. The process is thus notable for its simplicity.

Among the resins useful in this example is

| | |
|---|---|
| phenol | 1 mole |
| formol | 2.3 moles |
| soda NaOH | 3.6% of the weight of phenol |

EXAMPLE 2

100 parts by weight of phenol formaldehyde resin in fluid state was mixed with 10 parts by weight of Resorcinol in 80 percent aqueous solution, 1.5 parts silicone oil, 5 parts mineral filler, 5 parts of blowing agent, and 20 parts of a catalyst consisting of 10 parts by weight HCl in 35 percent aqueous solution and 10 parts of dicyandiamide-formaldehyde in 67 percent aqueous solution.

The reaction proceeded smoothly, forming a foam of non-flammable, self-extinguishing type.

Among the resins useful in this example is

| | |
|---|---|
| phenol | 1 mole |
| trioxane | 2.3 moles |
| soda NaOH | 3.6% of the weight of phenol |

The silicone oil and filler are not essential to the reaction, being additives which facilitate the foaming operation and add to the strength of the piece. The silicone oil in this case was a hydrosoluble silicone-glycol copolymer which is stable in solution and described in French Pat. No. 1,462,228; its presence assures the production of cells of uniform size uniformly dispersed throughout the mass.

In the absence of the Resorcinol the quantity of acid catalyst required would be at least double that which is recited in the examples. In the absence of the silicone oil the cells would be less uniform in size but the product would still be valuable for many uses, such as protective nests for packaging delicate instruments and insulation. The products can be used in contact with metallic pieces under circumstances in which the tendency to corrosion would have prevented the use of prior art resins lacking the Resorcinol. Thus, the field of use of phenolic resins has been substantially extended by this invention.

It is to be understood that the examples given above are of phenol formaldehyde resins of a common type, the Resorcinol and catalyst being mixed with the resin in its soft, thermoplastic state. The reaction begins at once, proceeding with a rise in temperature sufficient to vaporize the blowing agent and form the foam.

Resins involving other phenolic reactants, e.g. meta-cresol and 3,5 xylenol are also improved by the process of this invention. The electrical properties of such resins is improved, partly because of the reduction in the quantity of acid catalyst present. Color stability tends to be improved. The new resins are useful in all the uses for which phenolic resins of former types were satisfactory. A partial list of such uses is available in chemical dictionaries and other publications on the subject.

What is claimed is:

1. A method of making a non-corrosive acid-catalyzed non-flammable self-extinguishing phenol-formaldehyde resin which comprises mixing a liquid phenol-formaldehyde resin containing a ratio of formaldehyde to phenol of at least two, with from 5 to 8 percent by weight based on the resin of resorcinol, an organic liquid blowing agent having a boiling point from about 22° to 80°C., and about 10 percent by weight of dicyandiamide-formaldehyde and about 10 percent by weight of a 35 percent aqueous solution of HCl.

2. A method of making a non-corrosive acid-catalyzed non-flammable self-extinguishing phenol-formaldehyde resin which comprises mixing a liquid phenol formaldehyde resin containing a ratio of aldehyde to phenol of at least two with 10 % by weight of resorcinol in 80 percent aqueous solution, 1.5 percent by weight of a silicone oil, said oil being a hydrosoluble silicone-glycol copolymer, 5 percent by weight of a mineral filler, 5 percent by weight of an organic liquid blowing agent having a boiling point between 22°C. and 80°C., 10 percent by weight of dicyandiamide-formaldehyde in 67 percent aqueous solution and 10 percent by weight of 35 percent aqueous solution of HCl.

* * * * *

UNITED STATES PATENT AND TRADEMARK OFFICE
CERTIFICATE OF CORRECTION

PATENT NO. : 3,907,723
DATED : September 23, 1975
INVENTOR(S) : Monique Pretot

It is certified that error appears in the above—identified patent and that said Letters Patent are hereby corrected as shown below:

Col. 1, line 40, remove double bond from diagram

Col. 2, line 2, "Type" should read --type--;

Col. 2, line 10, "commposition" should read --composition--

Signed and Sealed this twentieth Day of April 1976

[SEAL]

Attest:

RUTH C. MASON
*Attesting Officer*

C. MARSHALL DANN
*Commissioner of Patents and Trademarks*